United States Patent
Ishikawa

(10) Patent No.: US 12,411,203 B2
(45) Date of Patent: Sep. 9, 2025

(54) COMMUNICATION APPARATUS

(71) Applicant: TOSHIBA TEC KABUSHIKI KAISHA, Tokyo (JP)

(72) Inventor: Hiroyuki Ishikawa, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 388 days.

(21) Appl. No.: 17/903,821

(22) Filed: Sep. 6, 2022

(65) Prior Publication Data

US 2023/0176172 A1   Jun. 8, 2023

(30) Foreign Application Priority Data

Dec. 2, 2021   (JP) ................ 2021-196446

(51) Int. Cl.
   *G01S 5/02*   (2010.01)
(52) U.S. Cl.
   CPC ................ *G01S 5/0249* (2020.05)
(58) Field of Classification Search
   CPC ........ G01S 5/0249; G01S 11/02; G01S 11/06; H01Q 3/02–10; G06K 7/10376–10405
   See application file for complete search history.

(56) References Cited

U.S. PATENT DOCUMENTS

| | | | |
|---|---|---|---|
| 10,565,410 B1 * | 2/2020 | Shmulevich | G06K 7/10356 |
| 10,572,703 B1 * | 2/2020 | Shyamkumar | G06K 7/10386 |
| 11,378,643 B2 | 7/2022 | Kamiya | |
| 2018/0074159 A1 * | 3/2018 | Mullessary | G01S 13/84 |
| 2019/0392183 A1 | 12/2019 | Oishi | |

FOREIGN PATENT DOCUMENTS

| | | |
|---|---|---|
| JP | H04324389 A | 11/1992 |
| JP | 2006065703 A | 3/2006 |
| JP | 2013114348 A | 6/2013 |
| JP | 2019219284 A | 12/2019 |
| JP | 2021018226 A | 2/2021 |
| JP | 2021101156 A | 7/2021 |
| KR | 101015448 B1 * | 2/2011 |

OTHER PUBLICATIONS

Notice of Reasons for Refusal (First Office Action) mailed Jul. 8, 2025 in corresponding Japanese Patent Application No. 2021-196446 with English machine translation, 4 pages.

* cited by examiner

*Primary Examiner* — Cassi J Galt
(74) *Attorney, Agent, or Firm* — Kim & Stewart LLP

(57) ABSTRACT

According to an embodiment, a communication apparatus acquires tag data of each wireless tag at a plurality of positions of a moved antenna via an antenna and inputs the tag data into a learned model. The communication apparatus acquires, on the basis of the input of the tag data of each wireless tag into the learned model, data indicating a level regarding the range in which each wireless tag is present from the learned model. In addition, the communication apparatus controls, in a case where the levels of the plurality of wireless tags acquired on the basis of one or more measurement processes for a plurality of wireless tags do not satisfy a condition, a measurement process involving a change of a measurement aspect with respect to the plurality of wireless tags.

8 Claims, 14 Drawing Sheets

Fig.3

| | Position (mm) | 0 | a | 2a | ... | L−2a | L−a | L |
|---|---|---|---|---|---|---|---|---|
| Wireless tag A | Phase (°) | | | | | | | |
| | Received signal strength indicator | | | | | | | |
| Wireless tag B | Phase (°) | | | | | | | |
| | Received signal strength indicator | | | | | | | |
| ... | ... | | | | | | | |

COMMUNICATION APPARATUS

CROSS-REFERENCE TO RELATED APPLICATION

This application is based upon and claims the benefit of priority from the prior Japanese Patent Application No. 2021-196446, filed on Dec. 2, 2021, the entire contents of which are incorporated herein by reference.

FIELD

An embodiment described here generally relates to a communication apparatus.

BACKGROUND

There exists an apparatus that receives radio waves transmitted from a wireless tag attached to an article through an antenna to thereby determine whether the wireless tag is inside or outside a predetermined range. Such an apparatus moves the antenna and measures a phase of the wireless tag. Such an apparatus determines whether the wireless tag is inside or outside a predetermined range on the basis of a phase difference that is the amount of change in the measured phase.

Such an apparatus can fail to measure a sufficient number of pieces of data for a determination process with respect to all wireless tags, depending on a movement speed of the antenna, the number of wireless tags, and the like. The determination accuracy of wireless tags not having a sufficient number of pieces of data can lower.

BRIEF DESCRIPTION OF THE DRAWINGS

FIG. 3 is a diagram showing an example of a data structure that constitutes measurement data according to the embodiment.

DETAILED DESCRIPTION

In accordance with one embodiment, a communication apparatus includes an antenna, a driving device, and a processor. The driving device moves the antenna. The processor acquires tag data of each wireless tag at a plurality of positions of the moved antenna via the antenna. The processor inputs the acquired tag data of each wireless tag into a learned model. The learned model is a model generated by machine learning based on learning data and the learning data includes tag data of wireless tags that are a plurality of learning targets and data indicating a range in which each of the wireless tags that are the plurality of learning targets is present. The processor acquires, on the basis of the input of the tag data of each wireless tag into the learned model, data indicating a level regarding the range in which each wireless tag is present from the learned model. In addition, the processor controls, in a case where the levels of the plurality of wireless tags acquired on the basis of one or more measurement processes for a plurality of wireless tags do not satisfy a condition, a measurement process involving a change of a measurement aspect with respect to the plurality of wireless tags.

Hereinafter, a communication system according to an embodiment will be further described with reference to the drawings. It should be noted that as to each of the figures used for explaining embodiments below, the scales of the respective parts are changed as appropriate in some cases. Further, each of the figures used for explaining embodiments below is shown with configurations omitted for the sake of explanation in some cases. In the figures, the same reference signs denote the same or similar parts.

Figure 1:
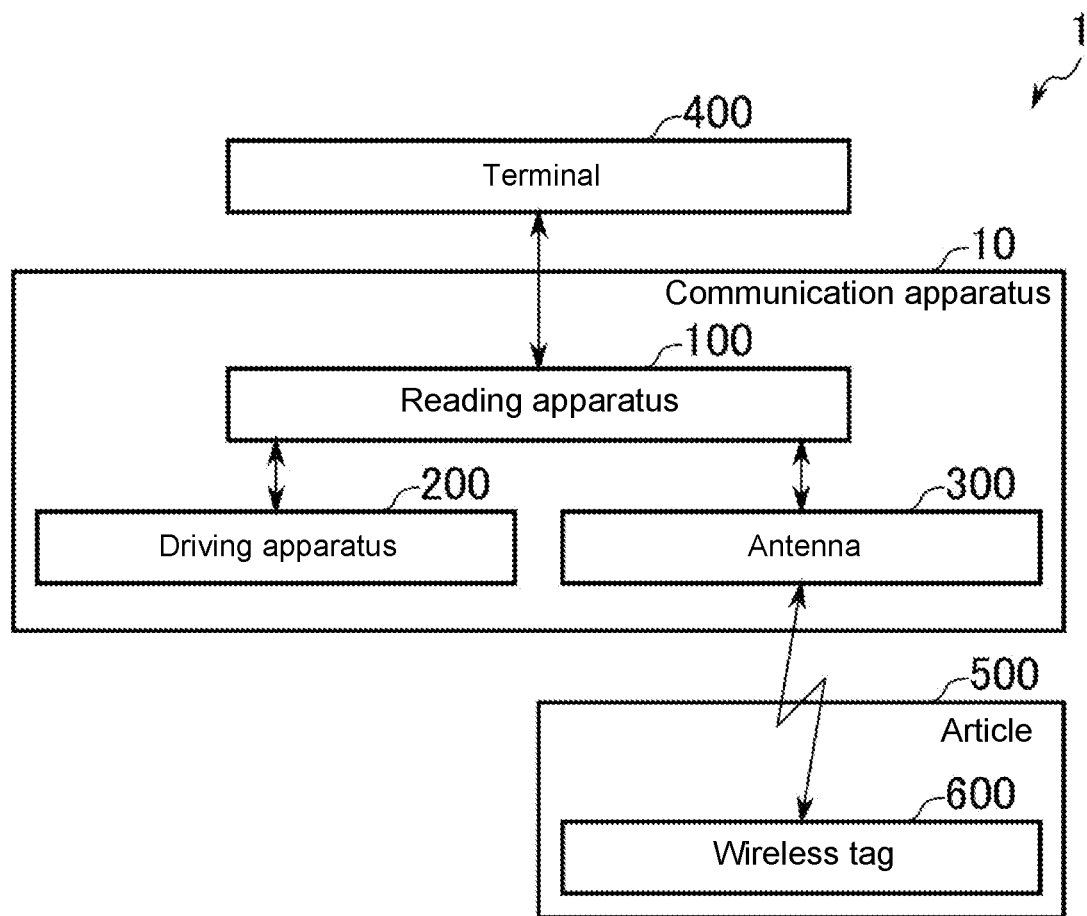
FIG. 1 is a block diagram showing an example of a communication system according to an embodiment.

FIG. 1 is a block diagram showing an example of a communication system 1 according to an embodiment. The communication system 1 includes a communication apparatus 10, a terminal 400, and a plurality of wireless tags 600 attached to a plurality of articles 500. Although FIG. 1 shows one wireless tag 600 attached to one article 500, the communication system 1 includes the plurality of wireless tags 600 attached to the plurality of articles 500. It should be noted that although the communication system 1 includes the communication apparatus 10 and the terminal 400, the communication system 1 does not need to include the plurality of articles 500.

The communication apparatus 10 is an apparatus that reads information from the wireless tag 600. The communication apparatus 10 can be used for checking goods in a warehouse, may be used for checking goods in a store or the like, and the application example of the communication apparatus 10 is not limited thereto. The communication apparatus 10 includes a reading apparatus 100, a driving apparatus 200, and an antenna 300.

The reading apparatus 100 is an apparatus that controls the driving apparatus 200 and the antenna 300 reads information from the wireless tag 600. A configuration example of the reading apparatus 100 will be described later. The driving apparatus 200 is an apparatus that moves the antenna 300. A configuration example of the driving apparatus 200 will be described later. The antenna 300 sends and receives radio waves to/from the wireless tag 600. The antenna 300 converts radio waves received from the wireless tag 600 into a high-frequency signal and outputs the high-frequency signal to the reading apparatus 100.

The terminal 400 is an apparatus that processes information read from the wireless tag 600 by the reading apparatus 100. The terminal 400 is a personal computer (PC) or the like, only needs to be an apparatus that processes information, and is not limited thereto.

The article 500 is a commodity or the like. Typically, the wireless tag 600 is a radio frequency identification (RFID) tag. The wireless tag 600 may be another wireless tag. The wireless tag 600 is a passive wireless tag that operates using predetermined radio waves emitted from the antenna 300 as the energy source. The wireless tag 600 emits a signal including information stored in the wireless tag 600 by performing backscatter modulation with respect to a non-modulated signal. The information stored in the wireless tag 600 may include uniquely identifiable identification information. The information stored in the wireless tag 600 may include information regarding the article 500 attached to the wireless tag 600.

Figure 2:
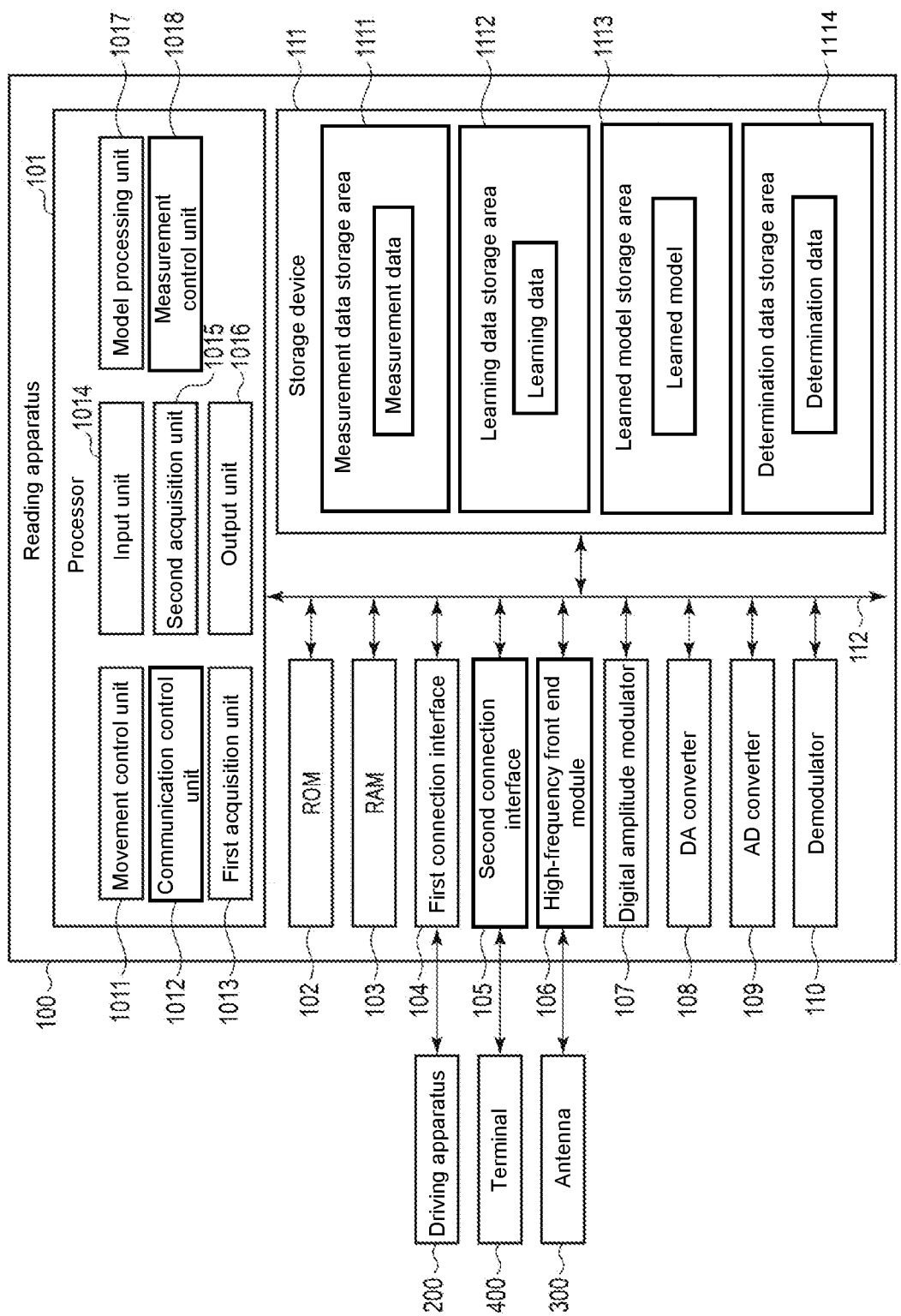
FIG. 2 is a block diagram showing an example of a reading apparatus according to the embodiment.

The reading apparatus 100 will be described with reference to FIG. 2. FIG. 2 is a block diagram showing an example of a configuration of the reading apparatus 100. The reading apparatus 100 includes a processor 101, a read-only memory (ROM) 102, a random-access memory (RAM) 103, a first connection interface 104, a second connection interface 105, a high-frequency front end module 106, a digital amplitude modulator 107, a digital to analog (DA) converter 108, an analog to digital (AD) converter 109, a demodulator 110, and a storage device 111. The respective parts included in the reading device 100 are connected via the bus 112 or the like.

The processor 101 corresponds to a central part of a computer that performs processes such as arithmetic operation and control required for the operation of the reading apparatus 100. The processor 101 puts various programs stored in the ROM 102, the storage device 111, or the like into the RAM 103. The processor 101 realizes respective parts to be described later and performs various operations by executing the programs loaded to the RAM 103.

The processor 101 is a central processing unit (CPU), a micro processing unit (MPU), a system on a chip (SoC), a digital signal processor (DSP), a graphics processing unit (GPU), an application specific integrated circuit (ASIC), a programmable logic device (PLD), a field-programmable gate array (FPGA), or the like. The processor 101 may be a combination of some of them.

The ROM 102 corresponds to a main storage apparatus of the computer using the processor 101 as the central part. The ROM 102 is a nonvolatile memory mainly used for reading data. The ROM 102 stores the above-mentioned programs. Further, the ROM 102 stores data, various setting values, and the like to use when the processor 101 performs various processes.

The RAM 103 corresponds to a main storage apparatus of the computer using the processor 101 as the central part. The RAM 103 is a memory used for reading and writing data. The RAM 103 is a work area for temporarily storing data to use when the processor 101 performs various processes.

The first connection interface 104 is an interface for the reading apparatus 100 to communicate with the driving apparatus 200.

The second connection interface 105 is an interface for the reading apparatus 100 to communicate with the terminal 400.

The high-frequency front end module 106 outputs a high-frequency signal to the antenna 300. To the high-frequency front end module 106, a high-frequency signal is input from the antenna 300.

The digital amplitude modulator 107 is a circuit that adds information sent to the wireless tag 600 to carrier waves sent to the wireless tag 600.

The DA converter 108 is a circuit that converts a digital signal into an analog signal. The DA converter 108 converts a digital signal modulated by the digital amplitude modulator 107 into an analog signal. The DA converter 108 outputs a high-frequency signal to the antenna 300 via the high-frequency front end module 106.

The AD converter 109 is a circuit that converts an analog signal into a digital signal. The AD converter 109 converts a high-frequency signal input from the antenna 300 into a digital signal via the high-frequency front end module 106.

The demodulator 110 is a circuit that extracts various kinds of information from radio waves received from the wireless tag 600. For example, the demodulator 110 extracts a unique identification code stored in the wireless tag 600 from the digital signal converted by the AD converter 109. Further, the demodulator 110 time-sequentially outputs the tag data of the wireless tag 600 from the digital signal converted by the AD converter 109 when radio waves of the wireless tag 600 are received from the antenna 300 by a well-known technology. The tag data is time-sequential data based on radio waves of the wireless tag 600 received by the antenna 300. The tag data includes phase data. The phase data is data indicating a phase of radio waves from the wireless tag 600. The tag data includes received signal strength indicator (RSSI) data. The received signal strength indicator data is data indicating received strength of radio waves from the wireless tag 600. The tag data includes at least one of the phase data or the received signal strength indicator data. It should be noted that when each wireless tag 600 receives radio waves emitted from the antenna 300, each wireless tag 600 can store the received signal strength indicator data in a memory of each wireless tag 600. In this example, the demodulator 110 may time-sequentially extract the received signal strength indicator data stored in the wireless tag 600 from the digital signal converted by the AD converter 109. The demodulator 110 is an example of a detector that time-sequentially detects tag data of each wireless tag 600 on the basis of radio waves from each wireless tag 600.

The storage device 111 is an apparatus constituted by a nonvolatile memory that stores data, a program, or the like. Although the storage device 111 is constituted by a hard disk drive (HDD), a solid state drive (SSD), or the like, the storage device 111 is not limited thereto. The storage device 111 is an example of the storage unit.

The storage device 111 has a measurement data storage area 1111. The measurement data storage area 1111 stores measurement data. The measurement data includes a plurality of determinative tag data sets for each measurement process. The measurement process is a process in which the communication apparatus 10 measures the tag data. The measurement process is a process involving a movement of the antenna 300. For example, a single measurement process is a process involving a movement of the antenna 300 in a scanning range of the antenna 300. The communication apparatus 10 can control a single measurement process or can control a plurality of measurement processes for wireless tags 600 that are a plurality of determination targets. The wireless tags 600 that are the plurality of determination targets is a set of wireless tags the tag data of which is measured by one or more common measurement processes of the communication apparatus 10.

The determinative tag data set is a data set for each wireless tag 600 that is a determination target. The determinative tag data set is a set of a plurality of pieces of tag data of the wireless tag 600 that is the determination target, which has been measured by the communication apparatus 10. Hereinafter, the tag data of the wireless tag 600 that is the determination target regarding the determinative tag data set will be also referred to as determinative tag data. The determinative tag data set includes a plurality of pieces of determinative tag data of the wireless tags 600 that are the determination targets at the plurality of positions of the antenna 300. Each of the plurality of positions of the antenna 300 is a measurement position of the tag data. Depending on the wireless tag 600 that is the determination target, the communication apparatus 10 can be capable of measuring the determinative tag data at all the plurality of positions of the antenna 300. In this example, the determinative tag data set includes determinative tag data associated with each of all the plurality of positions of the antenna 300. Depending on the wireless tag 600 that is the determination target, the communication apparatus 10 can be capable of measuring the determinative tag data only at some of the plurality of positions of the antenna 300. In this example, the determinative tag data set includes determinative tag data associated with each of some of the plurality of positions of the antenna 300. The plurality of determinative tag data sets is an example of the determinative tag data of respective wireless tags 600 that are the determination targets at the plurality of positions of the antenna 300.

The plurality of determinative tag data sets can be determinative tag data sets of all the wireless tags 600 that are the plurality of determination targets. The plurality of determinative tag data sets can be determinative tag data sets of some of the wireless tags 600 that are the plurality of determination targets. The plurality of determinative tag data sets is an example of the determinative tag data of respective wireless tags 600 that are the determination targets at the plurality of positions of the antenna 300.

The wireless tag 600 that is the determination target is a wireless tag that is a target with respect to which the range in which the wireless tag 600 is present is determined. The wireless tag 600 that is the determination target is an example of the wireless tag that is a measurement target. The wireless tag that is the measurement target will be also referred to as a measurement target wireless tag. The wireless tag 600 that is the determination target is an example of the wireless tag. The target with respect to which the range in which the wireless tag 600 is present is determined includes a target with respect to which whether the position of the wireless tag 600 is included in a first range or a second range is determined. The first range and the second range are different ranges not overlapping each other. For example, the first range and the second range are three-dimensional regions. An example of the first range and the second range will be described later. The measurement data can be updated on the basis of the measurement process of the communication apparatus 10. A configuration example of the measurement data will be described later.

The storage device 111 has a learning data storage area 1112. The learning data storage area 1112 stores learning data. The learning data is data including data measured by the communication apparatus in advance. Here, although the description will be given assuming that the communication apparatus that measures the data included in the learning data in advance is the communication apparatus 10 for the sake of simplification of the description, the communication apparatus may be one or more communication apparatuses of the same type as the communication apparatus 10. The learning data is data used for machine learning.

The learning data includes a learning tag data set. The learning tag data set includes a plurality of data sets regarding wireless tags 600 that are a plurality of learning targets. The wireless tags 600 that are the plurality of learning targets is a set of wireless tags the tag data of which is measured by one or more common measurement processes of the communication apparatus 10. The data set regarding the wireless tags 600 that are the learning targets includes a plurality of pieces of tag data of the wireless tags 600 that are the learning targets at the plurality of positions of the antenna 300. Hereinafter, the tag data of the wireless tags 600 that are the learning targets regarding the learning tag data set will be also referred to as learning tag data. Depending on the wireless tags 600 that are the learning targets, the communication apparatus 10 can be capable of measuring the learning tag data at all the plurality of positions of the antenna 300. In this example, the data set regarding the wireless tags 600 that are the learning targets includes learning tag data associated with each of all the plurality of positions of the antenna 300. Depending on the wireless tags 600 that are the learning targets, the communication apparatus 10 can be capable of measuring the learning tag data only at some of the plurality of positions of the antenna 300. In this example, the data set regarding the wireless tags 600 that are the learning targets includes learning tag data associated with each of some of the plurality of positions of the antenna 300. The data set regarding the wireless tags 600 that are the learning targets is an example of the learning tag data of the wireless tags 600 that are the learning targets. The learning tag data set is an example of the learning tag data of the wireless tags 600 that are the plurality of learning targets. The wireless tags 600 that are the learning targets is an example of the wireless tag.

The learning data includes data indicating a range in which each of the wireless tags 600 that are the plurality of learning targets is present. Hereinafter, the data indicating the range in which each of the wireless tags 600 that are the plurality of learning targets is present will be also referred to as correct data. The correct data includes data indicating whether each of the wireless tags 600 that are the plurality of learning targets is included in the first range or the second range. The wording, "each of the wireless tags 600 that are the plurality of learning targets" may be replaced by "the position of each of the wireless tags 600 that are the plurality of learning targets". The correct data is data input by a user. The learning data can be updated.

The storage device 111 includes a learned model storage area 1113. The learned model storage area 1113 stores a learned model. The learned model is a model that is generated by machine learning based on learning data. The term, "generation" includes not only an aspect of new creation but also an aspect of update. The plurality of learned models is used for determining the range in which the wireless tag 600 that is the determination target is present.

On the basis of the input of determinative input data, the learned model outputs determinative output data. The determinative input data is the plurality of determinative tag data sets described above for each measurement process. The determinative output data is data indicating a level regarding the range in which each wireless tag 600 that is the determination target is present. Hereinafter, the level regarding the range in which the wireless tag 600 that is the determination target is present will be also referred to as a determination level. The determination level is a degree indicating a probability that the wireless tag 600 that is the determination target is present in each of one or more ranges.

For example, the determination level is a probability, though not limited thereto. The determination level may be a scale selected from a plurality of scales, e.g., ten scales. Here, the description will be given assuming that the determination level is the probability.

The one or more ranges may be a single predetermined range or may be two or more different predetermined ranges not overlapping each other. The determination level includes a level regarding that the wireless tag 600 that is the determination target is included in each of the one or more ranges. In a case where the determination level is a probability, it is assumed that a total level regarding that the wireless tag 600 that is the determination target is included in each of the one or more ranges is 100%. In a case where the determination level is a scale, it is assumed that a total level regarding that the wireless tag 600 that is the determination target is included in each of the one or more ranges is an upper-limit scale number of the plurality of scales.

The range in which the wireless tag 600 that is the determination target is present can be determined on the basis of comparison of the determination level with a condition. The condition is a condition for enabling the range in which the wireless tag 600 that is the determination target is present to be determined on the basis of the determination level. The condition includes a condition that the determination level is equal to or larger than a threshold. The threshold is a threshold for enabling the range in which the wireless tag 600 that is the determination target is present to be determined. For example, the threshold is 70%, though not limited thereto. The threshold can be set as appropriate.

In a case where the determination level satisfies the condition, it is assumed that the range in which the wireless tag 600 that is the determination target is present can be determined. That the determination level satisfies the condition includes that the determination level is equal to or larger than the threshold. Hereinafter, the determination level that satisfies the condition will be also referred to as a sufficient determination level. On the other hand, it is assumed that in a case where the determination level does not satisfy the condition, the range in which the wireless tag 600 that is the determination target is present cannot be determined. That the determination level does not satisfy the condition includes that the determination level is smaller than the threshold. Hereinafter, the determination level that does not satisfy the condition will be also referred to as an insufficient determination level.

Here, the description will be given assuming that the one or more ranges includes the first range and the second range. The determination level includes the first level regarding that the wireless tag 600 that is the determination target is included in the first range. Hereinafter, the first level will be also referred to as a first determination level. The determination level includes the second level regarding that the wireless tag 600 that is the determination target is included in the second range. Hereinafter, the second level will be also referred to as a second determination level.

In this example, the condition includes a condition that the first determination level is equal to or larger than the first threshold or the second determination level is equal to or larger than the second threshold. The first threshold is a threshold for enabling the range in which the wireless tag 600 that is the determination target is present to be determined to be the first range. For example, the first threshold is 70%, though not limited thereto. Here, the description will be given assuming that the first threshold is 70%. The first threshold can be set as appropriate. The second threshold is a threshold for enabling the range in which the wireless tag 600 that is the determination target is present to be determined to be the second range. For example, the second threshold is 70%, though not limited thereto. Here, the description will be given assuming that the second threshold is 70%. The second threshold can be set as appropriate.

That the determination level satisfies the condition includes that the first determination level included in the determination level is equal to or larger than the first threshold or the second determination level included in the determination level is equal to or larger than the second threshold. In a case where the first level is equal to or larger than the first threshold, the range in which the wireless tag 600 that is the determination target is present can be determined to be the first range. On the other hand, in a case where the first level is smaller than the first threshold, the range in which the wireless tag 600 that is the determination target is present cannot be determined to be the first range. In a case where the second level is equal to or larger than the second threshold, the range in which the wireless tag 600 that is the determination target is present can be determined to be the second range. On the other hand, in a case where the second level is smaller than the second threshold, the range in which the wireless tag 600 that is the determination target is present cannot be determined to be the second range. For example, it is assumed that the determination level includes the first level that is a probability of 80% and the second level that is a probability of 20%. The range in which the wireless tag 600 that is the determination target is present can be determined to be the first range. In this example, the determination level is the sufficient determination level. On the other hand, for example, it is assumed that the determination level includes the first level that is a probability of 30% and the second level that is a probability of 70%. The range in which the wireless tag 600 that is the determination target is present can be determined to be the second range. In this example, the determination level is the sufficient determination level.

That the determination level does not satisfy the condition includes that the first level included in the determination level is smaller than the first threshold and the second level included in the determination level is smaller than the second threshold. In a case where the first level included in the determination level is smaller than the first threshold and the second level included in the determination level is smaller than the second threshold, the range in which the wireless tag 600 that is the determination target is present cannot be determined. For example, it is assumed that the determination level includes the first level that is a probability of 60% and the second level that is a probability of 40%. The range in which the wireless tag 600 that is the determination target is present cannot be determined to be either the first range or the second range. In this example, the determination level is the insufficient determination level.

The storage device 111 has a determination data storage area 1114. The determination data storage area 1114 includes determination data. The determination data includes a determination level data set based on determinative output data for each measurement process for the wireless tags 600 that are the plurality of determination targets. The determination level data set is a set of a plurality of determination levels for the wireless tags 600 that are the plurality of determination targets. The determination level data set can include determination levels respectively associated with all the wireless tags 600 that are the plurality of determination targets. The determination level data set can include determination levels respectively associated with some of the wireless tags 600 that are the plurality of determination targets. One or more determination levels included in the determination level data set can be all sufficient determination levels. One or more determination levels included in the determination level data set can be all insufficient determination levels. Some of one or more determination levels included in the determination level data set can be sufficient determination levels and the rest can be insufficient determination levels. The determination data can be updated every time the measurement process for the wireless tags 600 that are the plurality of determination targets is repeated.

The bus 112 includes a control bus, an address bus, a data bus, and the like. The bus 112 transmits a signal exchanged between the respective parts of the reading apparatus 100.

It should be noted that a hardware configuration of the reading apparatus 100 is not limited to the above-mentioned configuration. As to the reading apparatus 100, the above-mentioned components can be omitted or modified or new components can be added as appropriate.

The respective parts realized by the processor 101 will be described. The processor 101 realizes a movement control unit 1011, a communication control unit 1012, a first acquisition unit 1013, an input unit 1014, a second acquisition unit 1015, an output unit 1016, a model processing unit 1017, and a measurement control unit 1018. It can also be said that the respective parts realized by the processor 101 are respective functions. It can also be said that the respective parts realized by the processor 101 are realized by a control unit including the processor 101, the ROM 102, and the RAM 103.

The movement control unit 1011 controls the movement of the antenna 300 by controlling the driving apparatus 200.

The communication control unit 1012 controls radio wave transmission from the antenna 300.

The first acquisition unit 1013 acquires the plurality of determinative tag data sets.

The input unit 1014 inputs determinative input data into a learned model. The determinative input data is a plurality of determinative tag data sets acquired by the first acquisition unit 1013.

On the basis of the input of the determinative input data into the learned model by the input unit 1014, the second acquisition unit 1015 acquires determinative output data from the learned model.

The output unit 1016 outputs a determination result to the terminal 400. The determination result includes a plurality of sufficient determination levels for the wireless tags 600 that are the plurality of determination targets. The plurality of sufficient determination levels is respective sufficient determination levels for all the wireless tags 600 that are the plurality of determination targets. The plurality of sufficient determination levels can be acquired by the reading apparatus 100 in a single measurement process. The plurality of sufficient determination levels can be acquired by the reading apparatus 100 in a plurality of measurement processes. In this case, each of the plurality of sufficient determination levels is a determination level acquired by the reading apparatus 100 in any one of the plurality of measurement processes. It should be noted that the n sufficient determination data can include a plurality of determination levels based on a plurality of measurement processes with respect to a wireless tag 600 that is a certain determination target. In this case, it is sufficient that the determination result includes any one of the plurality of sufficient determination levels as a sufficient determination level for the wireless tag 600 that is this determination target.

The model processing unit 1017 generates a learned model.

The measurement control unit 1018 controls the measurement process.

FIG. 3 is a diagram showing an example of a data structure that constitutes measurement data. It is assumed that the antenna 300 moves reciprocally in one direction under the control of the driving apparatus 200. It is assumed that the scanning range of the antenna 300 is a range to a position L from a position 0 corresponding to a home position. The position L can be set as appropriate.

The measurement data includes determinative tag data set of each wireless tag 600 that is the determination target for each measurement process. The determinative tag data set includes a plurality of pieces of determinative tag data of the wireless tags 600 that are the determination targets at the plurality of positions of the antenna 300. For example, the plurality of positions of the antenna 300 includes positions in constant intervals a between the position 0 to the position L. A value of the constant interval a can be set as appropriate. Depending on the wireless tag 600 that is the determination target, the communication apparatus 10 can be capable of measuring the determinative tag data at all the positions in the constant intervals a between the position 0 to the position L. Depending on the wireless tag 600 that is the determination target, the communication apparatus 10 can be capable of measuring the determinative tag data at some of the positions in the constant intervals a between the position 0 to the position L. The plurality of positions of the antenna 300 may include one or more positions different from the positions in the constant intervals a between the position 0 to the position L.

Figure 4:
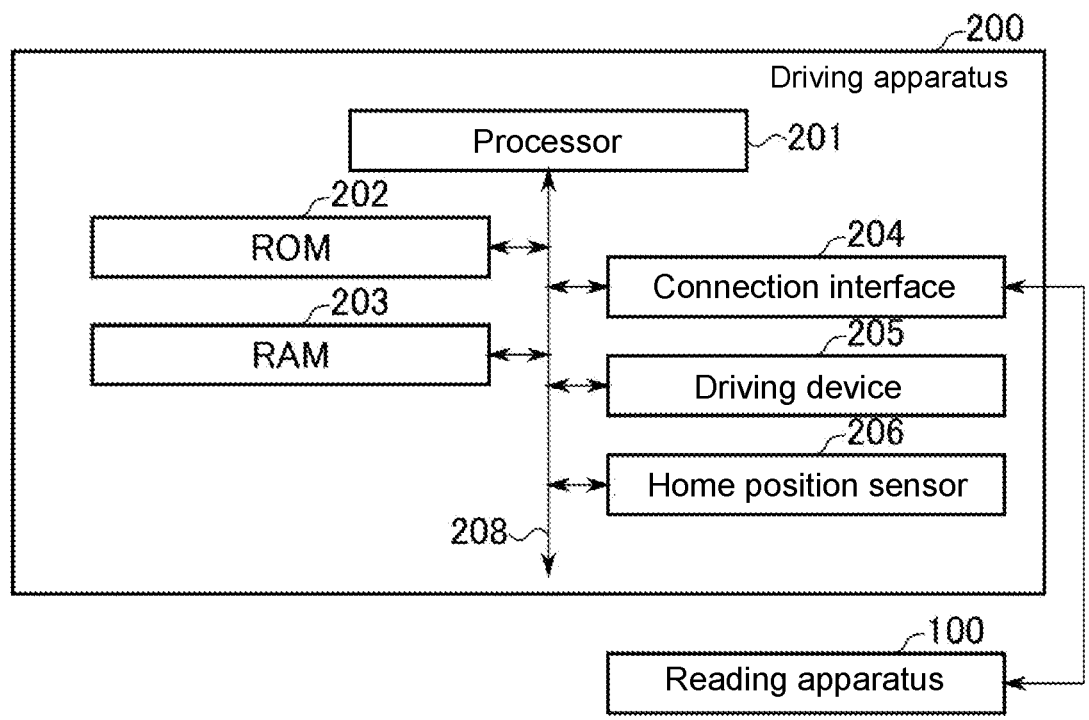
FIG. 4 is a block diagram showing an example of a driving apparatus according to the embodiment.

The driving apparatus 200 will be described with reference to FIGS. 4 and 5. FIG. 4 is a block diagram showing an example of the driving apparatus 200. The driving apparatus 200 includes a processor 201, a ROM 202, a RAM 203, a connection interface 204, a driving device 205, and a home position sensor 206. The respective parts included in the driving apparatus 200 are connected via the bus 208 or the like.

The processor 201 corresponds to a central part of a computer that performs processes such as arithmetic operation and control required for the operation of the driving apparatus 200. The processor 201 puts various programs stored in the ROM 202 or the like into the RAM 203. The processor 201 performs various operations by executing the programs loaded to the RAM 203. The processor 201 is a CPU, an MPU, a SoC, a DSP, a GPU, an ASIC, a PLD, an FPGA or the like. The processor 201 may be a combination of some of them.

The ROM 202 corresponds to a main storage apparatus of the computer using the processor 201 as the central part. The ROM 202 is a nonvolatile memory mainly used for reading data. The ROM 202 stores the above-mentioned programs. The ROM 202 stores data, various setting values, and the like to use when the processor 201 performs various processes.

The RAM 203 corresponds to a main storage apparatus of the computer using the processor 201 as the central part. The RAM 203 is a memory used for reading and writing data. The RAM 203 is a work area for temporarily storing data to use when the processor 201 performs various processes.

The connection interface 204 is an interface for connecting the driving apparatus 200 to the reading apparatus 100.

The driving device 205 moves the antenna 300. For example, the driving device 205 is a stepping motor.

The home position sensor 206 is a sensor that detects whether or not a movement stage 213 (see FIG. 5) to be described later is at the home position.

The bus 208 includes a control bus, an address bus, a data bus, and the like. The bus 208 transmits a signal exchanged between the respective parts of the driving apparatus 200.

Figure 5:
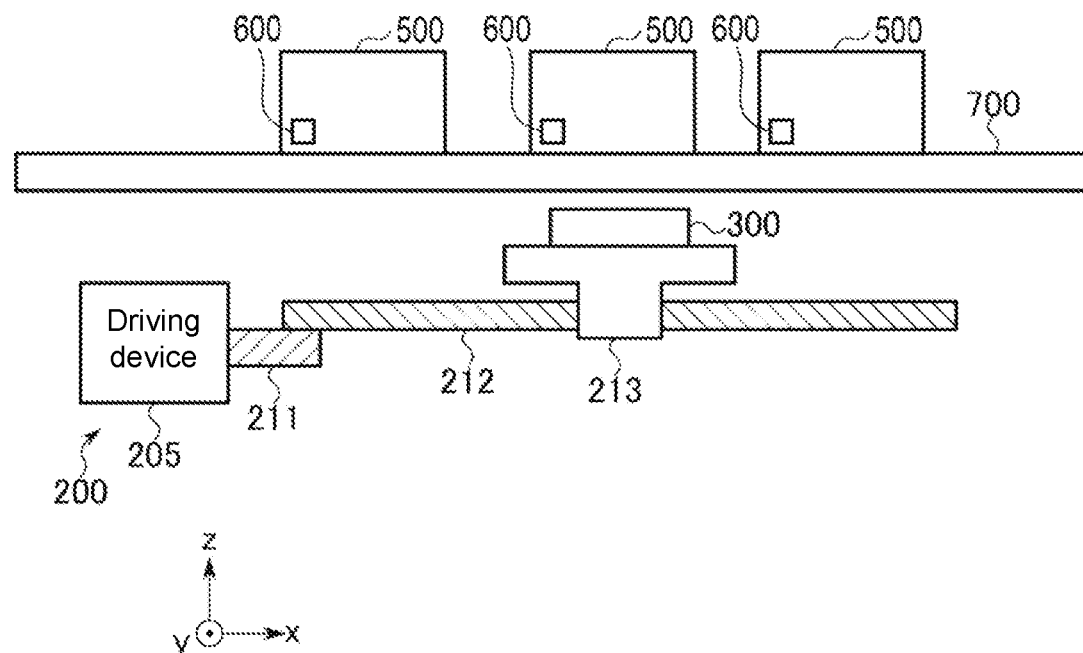
FIG. 5 is a schematic view for describing the driving apparatus according to the embodiment.

FIG. 5 is a schematic view for describing the driving apparatus 200. The driving apparatus 200 includes a rotation shaft 211, a rail 212, and the movement stage 213.

As illustrated in FIG. 5, the driving apparatus 200 and the antenna 300 is arranged below the counter table 700. The counter table 700 is a table having a horizontal surface on which the article 500 to which the wireless tag 600 has been attached is placed. The counter table 700 is an example of a placement portion. The counter table 700 may be included in the communication system 1 or the communication apparatus 10.

The rotation shaft 211 transmits driving force of the driving device 205. Thread grooves are formed in the rotation shaft 211 and the rail 212. The thread grooves of the rail 212 face and are coupled with the thread grooves of the rotation shaft 211. Therefore, when the driving device 205 is rotationally driven, the rotation shaft 211 rotates and the rail 212 moves (rotates). The movement stage 213 on which the antenna 300 is placed is mounted on the rail 212.

The movement stage 213 has a ball screw nut. When the rail 212 rotates through the ball screw nut, the movement stage 213 moves horizontally. That is, the movement stage 213 moves in a direction along the x-axis shown in FIG. 5. Further, when the rail 212 rotates in an opposite direction, the movement stage 213 moves in an opposite direction. In this manner, the driving apparatus 200 reciprocally moves the antenna 300 along the rail 212 in one direction of the x-axis.

It should be noted that a hardware configuration of the driving apparatus 200 is not limited to the above-mentioned configuration. For example, in the embodiment described above, the antenna 300 is moved in the one-axis direction by the driving apparatus 200, but in a modified example of the embodiment, the antenna 300 may be moved in a direction of two or more, or the antenna 300 may be rotated. As to the driving apparatus 200, the above-mentioned components can be omitted or modified or new components can be added as appropriate.

Figure 6:
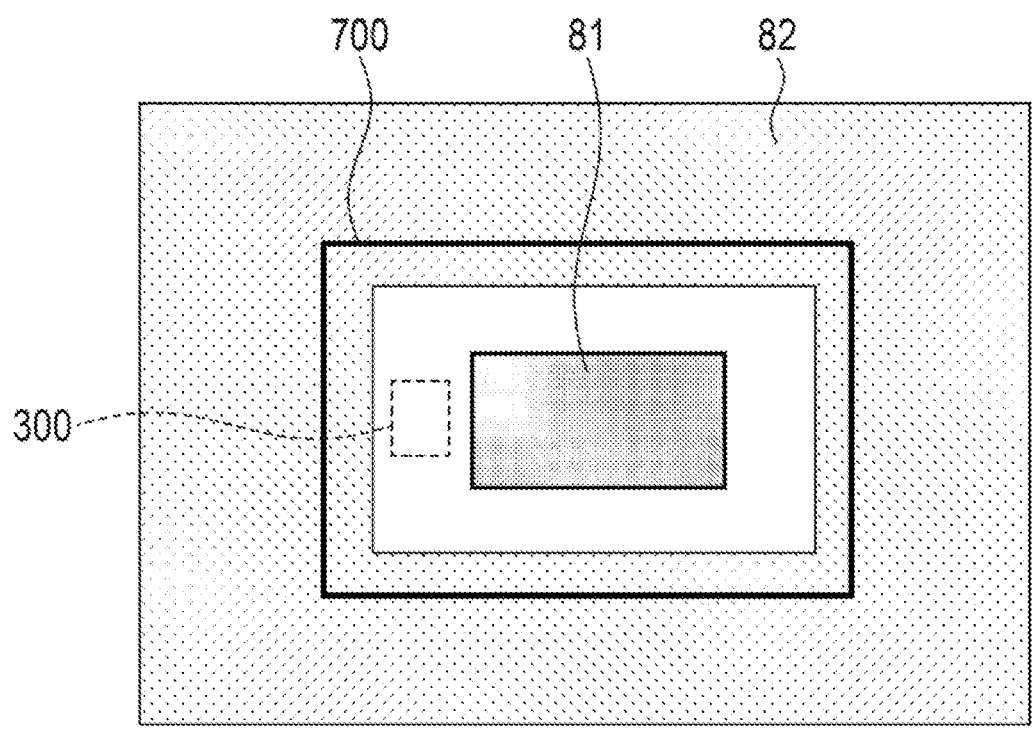
FIG. 6 is a schematic view for describing a first range and a second range according to the embodiment.

The first range and the second range will be described. FIG. 6 is a schematic view for describing a first range 81 and a second range 82, and is a plan view as the counter table 700 is viewed from above.

The first range 81 and the second range 82 are ranges separated horizontally. The first range 81 is a range set at a central portion of the horizontal surface of the counter table 700. The second range 82 is a range set in an outer peripheral portion of the horizontal surface of the counter table 700 and outside the counter table 700 horizontally. The second range 82 is set to surround the first range 81. Although the second range 82 is set not to be adjacent to the first range 81 but to be spaced apart from the first range 81 in FIG. 6, it is not limited thereto. The second range 82 may be adjacent to the first range 81.

It should be noted that settings of the first range 81 and the second range 82 are not limited thereto. The first range 81 may be a range set in the central portion of the horizontal surface of the counter table 700 and the second range 82 may be a range set in the outer peripheral portion of the horizontal surface of the counter table 700. The first range 81 may be a range set in the entire horizontal surface of the counter table 700 and the second range 82 may be a range set outside the counter table 700 horizontally. The second range 82 is not limited to the range set to surround the first range 81.

The first range 81 and the second range 82 only need to be different ranges not overlapping each other, and are not limited to the ranges separated horizontally. The first range 81 and the second range 82 may be ranges separated vertically.

Next, a determination process by the processor 101 of the reading apparatus 100 configured in the above-mentioned manner will be described. The determination process is a process of acquiring data indicating the level regarding the range in which each wireless tag 600 that is the determination target is present.

Figure 7:
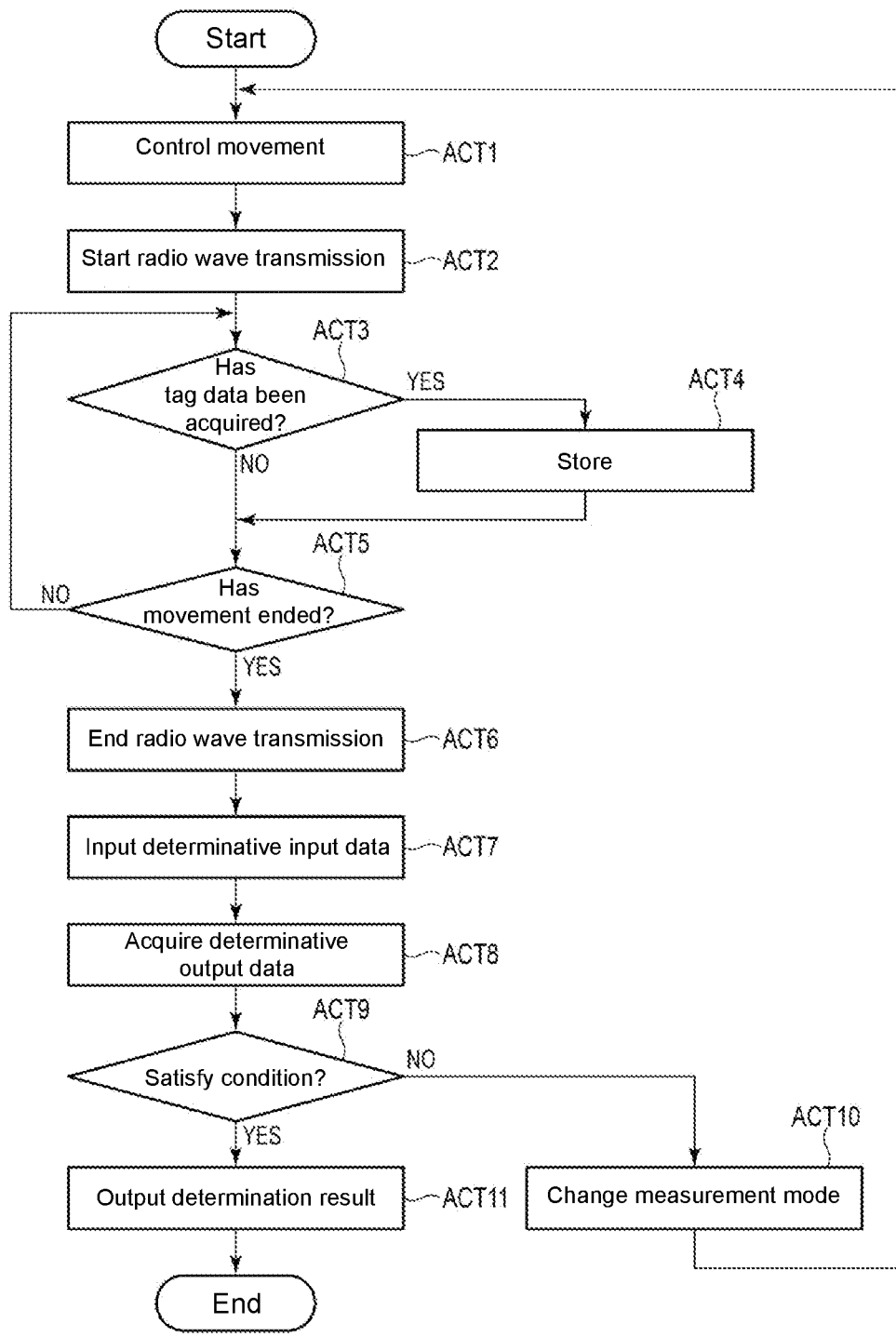
FIG. 7 is a flowchart showing an example of a determination process by a processor of the reading apparatus according to the embodiment.

FIG. 7 is a flowchart showing an example of the determination process by the processor 101 of the reading apparatus 100. It should be noted that a procedure of processes to be described below is merely an example, and each process may be changed as long as it is possible. Further, as to the procedure of processes to be described below, steps can be omitted, substituted, or added as appropriate in accordance with the embodiment.

For example, it is assumed that the article 500 that is a target for reading information stored in the wireless tag 600 is placed on the counter table 700. The wireless tag 600 attached to the article 500 placed on the counter table 700 can be the wireless tag 600 that is the determination target. An article that is not the target for reading information stored in the wireless tag 600 can be present in vicinity of the counter table 700. The wireless tag 600 attached to the article present in vicinity of the counter table 700 can be the wireless tag 600 that is the determination target.

The processor 101 of the reading apparatus 100 may start the determination process in accordance with acquisition of an instruction to start the determination process that the user has input through the terminal 400.

In ACT 1 of FIG. 7, the movement control unit 1011 of the processor 101 controls the movement of the antenna 300. For example, the movement control unit 1011 sends a movement instruction to the driving apparatus 200. The movement instruction is an instruction to move the antenna 300 in one direction from the position 0 corresponding to the home position to the position L.

The processor 201 of the driving apparatus 200 receives the movement instruction from the reading apparatus 100. Following the movement instruction, the processor 201 determines whether or not the antenna 300 is at the home position by using the home position sensor 206. In a case where the antenna 300 is not at the home position, the processor 201 controls the driving device 205 to move the antenna 300 to the home position. Under the control of the processor 201, the driving device 205 moves the antenna 300 to the home position. The processor 201 controls the driving device 205 to start the movement of the antenna 300 from the position 0 corresponding to the home position. Under the control of the processor 201, the driving device 205 starts the movement of the antenna 300 from the position 0. The processor 201 controls the driving device 205 to move the antenna 300 in one direction from the position 0 to the position L. Under the control of the processor 201, the driving device 205 moves the antenna 300 in one direction from the position 0 to the position L.

In ACT 2 of FIG. 7, the communication control unit 1012 of the processor 101 controls the start of radio wave transmission from the antenna 300. For example, the communication control unit 1012 controls the start of radio wave transmission from the antenna 300 on the basis of the start of the movement of the antenna 300 from the position 0. On the basis of a movement start notification from the driving apparatus 200, the communication control unit 1012 may control the start of radio wave transmission from the antenna 300. The movement start notification may indicate that the movement of the antenna 300 from the position 0 has started. The antenna 300 starts radio wave transmission.

Next, in ACT 3, the first acquisition unit 1013 of the processor 101 determines whether or not the determinative tag data of each wireless tag 600 that is the determination target has been acquired. For example, the first acquisition unit 1013 acquires the determinative tag data of each wireless tag 600 that is the determination target, which has been detected by the demodulator 110. In a case where the first acquisition unit 1013 determines that the first acquisition unit 1013 has acquired the determinative tag data (YES in ACT 3), the process of the processor 101 shifts from ACT 3 to ACT 4. In a case where the first acquisition unit 1013 determines that the first acquisition unit 1013 has not acquired the determinative tag data (NO in ACT 3), the process of the processor 101 shifts from ACT 3 to ACT 5.

In ACT 4, the first acquisition unit 1013 of the processor 101 stores the determinative tag data in the measurement data storage area 1111 in accordance with acquisition of the determinative tag data of each wireless tag 600 that is the determination target.

In ACT 5, the communication control unit 1012 of the processor 101 determines whether or not the movement of the antenna 300 has ended. For example, the communication control unit 1012 determines whether or not the movement of the antenna 300 from the position 0 to the position L has ended. The communication control unit 1012 may determine that the movement of the antenna 300 has ended on the basis of a movement end notification from the driving apparatus 200. The movement end notification may indicate that the movement of the antenna 300 has ended by reaching the position L. In a case where the communication control unit 1012 determines that the movement of the antenna 300 has ended (YES in ACT 5), the process of the processor 101 shifts from ACT 5 to ACT 6. In a case where the communication control unit 1012 determines that the movement of the antenna 300 has ended (NO in ACT 5), the process of the processor 101 shifts from ACT 5 to ACT 3.

The first acquisition unit 1013 of the processor 101 repeats the processes of ACT 3 and ACT 4 until the antenna 300 ends the movement at the position L after the antenna 300 starts the movement at the position 0.

The first acquisition unit 1013 of the processor 101 acquires the plurality of determinative tag data sets in the single measurement process by repeating the process of ACT 3. For example, the first acquisition unit 1013 sequentially acquires the determinative tag data at some of or all the plurality of positions of the antenna 300 with respect to each wireless tag 600 that is the determination target. The first acquisition unit 1013 may sequentially acquire the determinative tag data at some or all of the positions in the constant intervals a between the position 0 to the position L. The number of positions of the determinative tag data measured by the communication apparatus 10 can be the same or different for each wireless tag 600 that is the determination target. The first acquisition unit 1013 is capable of acquiring the position of the antenna 300 in cooperation with the driving apparatus 200.

The first acquisition unit 1013 of the processor 101 stores the plurality of determinative tag data sets in the measurement data storage area 1111 in the single measurement process by repeating the process of ACT 4. For example, the first acquisition unit 1013 stores the determinative tag data in the measurement data storage area 1111 every time the first acquisition unit 1013 acquires the determinative tag data with respect to each wireless tag 600 that is the determination target. The first acquisition unit 1013 stores the determinative tag data in the measurement data storage area 1111 in association with the position of the antenna 300. The first acquisition unit 1013 may store in the measurement data storage area 1111 the determinative tag data at some or all of the positions in the constant intervals a between the position 0 to the position L.

In ACT 6 of FIG. 7, the communication control unit 1012 of the processor 101 controls the end of radio wave transmission from the antenna 300. For example, the communication control unit 1012 controls the end of radio wave transmission from the antenna 300 on the basis of the end of the movement of the antenna 300 from the position 0 to the position L. The antenna 300 ends radio wave transmission.

In ACT 7, the input unit 1014 of the processor 101 inputs the determinative input data into the learned model. For example, the input unit 1014 acquires the determinative input data on the basis of the measurement data stored in the measurement data storage area 1111. The input unit 1014 acquires the plurality of determinative tag data sets in the single measurement process as the determinative input data. The input unit 1014 inputs the acquired determinative input data into the learned model.

In ACT 8, the second acquisition unit 1015 of the processor 101 acquires the determinative output data from the learned model on the basis of the input of the determinative input data into the learned model by the input unit 1014. For example, the second acquisition unit 1015 acquires the determinative output data in the single measurement process from the learned model. The second acquisition unit 1015 stores, in the determination data storage area 1114, the determination level data set in the single measurement process, which is based on the acquired determinative output data.

In ACT 9, the measurement control unit 1018 of the processor 101 determines whether or not determination levels for wireless tags 600 that are a plurality of measurement targets satisfy the condition. For example, the measurement control unit 1018 acquires, on the basis of the determination data stored in the determination data storage area 1114, the determination levels for the wireless tags 600 that are the plurality of measurement targets. The determination levels for the wireless tags 600 that are the plurality of measurement targets are based on one or more pieces of determinative output data acquired by the second acquisition unit 1015 on the basis of one or more measurement processes. That the determination levels for the wireless tags 600 that are the plurality of measurement targets satisfy the condition includes respective determination levels for all the wireless tags 600 that are the plurality of determination targets satisfy the condition. That the respective determination levels for all the wireless tags satisfy the condition corresponds to that sufficient determination levels respectively associated with all the wireless tags are present.

That the determination levels for the wireless tags 600 that are the plurality of measurement targets do not satisfy the condition includes that a determination level for at least one of the wireless tags 600 that are the plurality of determination targets does not satisfy the condition. That the determination level for the at least one wireless tag does not satisfy the condition corresponds to that the sufficient determination level is not associated with the at least one wireless tag.

The measurement control unit 1018 of the processor 101 compares the determination levels respectively associated with the wireless tags 600 that are the plurality of determination targets with the condition. The determination data can include a plurality of determination levels based on a plurality of measurement processes with respect to a wireless tag 600 that is a certain determination target. In this case, the measurement control unit 1018 compares each of the plurality of determination levels with the condition. In a case where at least one of the plurality of determination levels satisfies the condition, the measurement control unit 1018 determines that the determination level for the wireless tag 600 that is the determination target satisfies the condition. In a case where each of the determination levels for all the plurality of determination levels does not satisfy the condition, the measurement control unit 1018 determines that the determination level for the wireless tag 600 that is the determination target does not satisfy the condition.

In a case where the measurement control unit 1018 determines that the determination levels for the wireless tags 600 that are the plurality of measurement targets do not satisfy the condition (NO in ACT 9), the process of the processor 101 shifts from ACT 9 to ACT 10. In a case where the measurement control unit 1018 determines that the determination levels for the wireless tags 600 that are the plurality of measurement targets satisfy the condition (YES in ACT 9), the process of the processor 101 shifts from ACT 9 to ACT 11.

In ACT 10 of FIG. 7, the measurement control unit 1018 of the processor 101 controls a measurement process involving a change of the measurement aspect with respect to the wireless tags 600 that are the plurality of measurement targets. For example, the measurement control unit 1018 repeats the control of the measurement process involving the change of the measurement aspect until the determination levels for the wireless tags 600 that are the plurality of measurement targets satisfy the condition in ACT 9. The measurement aspect is an aspect for measuring, by the communication apparatus 10, the tag data with respect to the wireless tags 600 that are the plurality of measurement targets. The measurement aspect includes a hardware operation in the communication apparatus 10. The measurement aspect includes a software process in the communication apparatus 10.

The change of the measurement aspect includes changing into a measurement aspect that increases the number of pieces of data of the determinative tag data of the wireless tag 600 that is the determination target, which is measured in the single measurement process. As the number of pieces of data of the determinative tag data that is the determinative input data becomes larger, the estimation accuracy of the learned model for the range in which the wireless tag 600 that is the determination target is present becomes higher. As the number of pieces of data of the determinative tag data becomes larger, it is more likely that the determination level acquired from the learned model becomes a sufficient determination level that satisfies the condition. The measurement process involving the change of the measurement aspect enables the communication apparatus 10 to acquire a sufficient determination level with respect to the wireless tag 600 that is the determination target with respect to which the communication apparatus 10 has failed to acquire the sufficient determination level.

Hereinafter, the measurement process before changing the measurement aspect will be also referred to as a first measurement process. The measurement process after changing the measurement aspect will be also referred to as a second measurement process. The first measurement process corresponds to a measurement process performed just before the second measurement process. The second measurement process corresponds to a measurement process involving a change of a measurement aspect. In a case where a plurality of measurement processes has been performed before the second measurement process, the first measurement process is a measurement process of the plurality of measurement processes, which has been performed last in chronological order.

As an example, the measurement aspect includes a movement speed of the antenna 300. The measurement process involving the change of the measurement aspect includes a measurement process involving lowering the movement speed of the antenna 300. The movement speed of the antenna 300 in the first measurement process will be also referred to as a first movement speed. The movement speed of the antenna 300 in the second measurement process will be also referred to as a second movement speed.

The measurement control unit 1018 of the processor 101 controls the measurement process at the first movement speed of the antenna 300 in the first measurement process. In this example, the measurement control unit 1018 controls to move the antenna 300 at the first movement speed. Under the control of the measurement control unit 1018, the movement control unit 1011 controls the movement of the antenna 300 at the first movement speed in ACT 1. The driving device 205 moves the antenna 300 at the first movement speed. The measurement control unit 1018 controls the measurement process at the second movement speed lower than the first movement speed in the second measurement process. In this example, the measurement control unit 1018 controls to move the antenna 300 at the second movement speed. Under the control of the measurement control unit 1018, the movement control unit 1011 controls the movement of the antenna 300 at the second movement speed in ACT 1. The driving device 205 moves the antenna 300 at the second movement speed.

A degree of reduction of the movement speed of the antenna 300 may be constant between the measurement processes. The degree of reduction of the movement speed of the antenna 300 may be increased in chronological order for each interval between the measurement processes. The degree of reduction of the movement speed of the antenna 300 may be decreased in chronological order for each interval between the measurement processes. When the movement speed of the antenna 300 lowers, the number of pieces of data of the determinative tag data of the wireless tag 600 that is the determination target, which is measured by the communication apparatus 10 in the single measurement process, increases.

As another example, the measurement aspect includes masking one or more wireless tags 600 that are determination targets. The measurement process involving the change of the measurement aspect includes a measurement process involving masking wireless tags 600 that is one or more determination targets that satisfy the condition.

Masking the wireless tag 600 that is the determination target includes excluding the wireless tag 600 that is the determination target from a reading target. The wireless tags 600 of the wireless tags 600 that are the plurality of determination targets, which are the one or more determination targets that satisfy the condition, are targets not to be read by the communication apparatus 10 in the second measurement process. In this example, the communication apparatus 10 does not acquire the tag data of the wireless tags 600 that are the one or more determination targets that satisfy the condition. It should be noted that in a case where the plurality of measurement processes is performed before the second measurement process, the determination data can include a plurality of determination levels with respect to a wireless tag 600 that is a certain determination target. In this case, in a case where one of the plurality of determination levels satisfies the condition, the measurement control unit 1018 determines to mask the wireless tag that is the determination target.

Not masking the wireless tag 600 that is the determination target includes selecting the wireless tag 600 that is the determination target and setting the wireless tag 600 that is the determination target as a reading target. The one or more wireless tags 600 that are the determination targets of the wireless tags 600 that are the plurality of determination targets, which do not satisfy the condition, are targets to be read by the communication apparatus 10 in the second measurement process. In this example, the communication apparatus 10 acquires the tag data in the one or more wireless tags 600 that are the determination targets, which do not satisfy the condition.

The measurement control unit 1018 controls a measurement process involving masking the wireless tags 600 that are the one or more determination targets that satisfy the condition in the second measurement process. Under the control of the measurement control unit 1018, the communication control unit 1012 masks the wireless tags 600 that are the one or more determination targets that satisfy the condition and controls the communication via the antenna 300 in ACT 2.

The number of wireless tags 600 that are the determination targets of the wireless tags 600 that are the plurality of determination targets, which satisfy the condition, increases in each measurement process. Therefore, the number of wireless tags 600 that are the determination targets of the wireless tags 600 that are the plurality of determination targets, which become masking targets, increases in each measurement process. The communication apparatus 10 is capable of narrowing the wireless tags 600 that are the determination target, which do not satisfy the condition, and performing the measurement process. By the communication apparatus 10 narrowing the wireless tags 600 that are the determination targets, the number of pieces of data of the determinative tag data of the wireless tag 600 that is the determination target, which is measured in the single measurement process, increases.

It should be noted that the measurement control unit 1018 may control a measurement process involving a change of the measurement aspect, combining the above-mentioned two examples. In this example, the measurement control unit 1018 controls a measurement process involving both lowering the movement speed of the antenna 300 and masking the one or more wireless tags that satisfy the condition. The number of pieces of data of the determinative tag data of the wireless tag 600 that is the determination target, which is measured by the communication apparatus 10 in the single measurement process, becomes larger than that in a case where it involves only either one of the two examples.

The reading apparatus 100 performs the one or more measurement processes until the determination levels for the wireless tags 600 that are the plurality of measurement targets satisfy the condition in ACT 9. In accordance with the process of ACT 1 for each measurement process, the movement control unit 1011 controls the movement of the antenna 300 for each measurement process. The movement control unit 1011 may change the direction to move the antenna 300 alternately in each measurement process. That is, the direction to move the antenna 300 in the second measurement process may be different from the direction to move the antenna 300 in the first measurement process. For example, the movement control unit 1011 switches between the control to move the antenna 300 from the position 0 to the position L and the control to move the antenna 300 from the position L to the position 0 alternately in each measurement process.

Hereinafter, the control to move the antenna 300 from the position 0 to the position L will be also referred to as a first movement control. The movement of the antenna 300 from the position 0 to the position L is an example of the movement of the antenna 300 in the single measurement process. Under the first movement control of the movement control unit 1011, the driving device 205 moves the antenna 300 in one direction from the position 0 to the position L in the single measurement process. In the first movement control, the communication control unit 1012 determines whether or not the movement of the antenna 300 from the position 0 to the position L has ended in ACT 5.

Hereinafter, the control to move the antenna 300 from the position L to the position 0 will be also referred to as a second movement control. The movement of the antenna 300 from the position L to the position 0 is an example of the movement of the antenna 300 in the single measurement process. Under the second movement control of the movement control unit 1011, the driving device 205 moves the antenna 300 in one direction from the position L to the position 0 in the single measurement process. In the second movement control, the communication control unit 1012 determines whether or not the movement of the antenna 300 from the position L to the position 0 has ended in ACT 5.

A movement process in a first measurement process may be a first movement process. A movement process in a second measurement process may be a second movement process. The position 0 is an example of a first position. The position L is an example of a second position different from the first position. In this example, the communication apparatus 10 is capable of realizing the one or more measurement processes while repeating the first movement process and the second movement process for each measurement process. The communication apparatus 10 does not need to start the movement of the antenna 300 after returning the position of the antenna 300 to the position 0 for each measurement process. Therefore, the communication apparatus 10 is capable of reducing the time until the determination levels for the wireless tags 600 that are the plurality of measurement targets satisfy the condition.

In accordance with the process of ACT 3 for each measurement process, the first acquisition unit 1013 acquires the plurality of determinative tag data sets for each measurement process. In accordance with the process of ACT 4 for each measurement process, the first acquisition unit 1013 stores the plurality of determinative tag data sets in the measurement data storage area 1111 for each measurement process. In accordance with the process of ACT 7 for each measurement process, the input unit 1014 inputs the plurality of determinative tag data sets into the learned model as the determinative input data for each measurement process. In accordance with the process of ACT 8 for each measurement process, the second acquisition unit 1015 acquires the determinative output data from the learned model for each measurement process. The second acquisition unit 1015 stores the determination level data set based on the determinative output data in the determination data storage area 1114 for each measurement process. The determination data includes the determination level data set based on the determinative output data acquired by the second acquisition unit 1015 for each measurement process. In ACT 11 of FIG. 7, the output unit 1016 of the processor 101 outputs a determination result to the terminal 400. For example, the output unit 1016 acquires the determination result on the basis of the determination data stored in the determination data storage area 1114. The determination result includes the plurality of sufficient determination levels for the wireless tags 600 that are the plurality of determination targets. The determination result may include information stored in each wireless tag 600 that is the determination target read by the reading apparatus 100. The output unit 1016 outputs the acquired determination result to the terminal 400 via the second connection interface 105. The terminal 400 may determine the range in which each wireless tag 600 that is the determination target is present on the basis of the plurality of sufficient determination levels for the wireless tags 600 that are the plurality of determination targets included in the determination result. The terminal 400 may process the information stored in each wireless tag 600 that is the determination target in a manner that depends on whether each wireless tag 600 that is the determination target is included in either the first range or the second range. The terminal 400 may set the information stored in each wireless tag 600 that is the determination target, which is included in the first range, as a processing target. The terminal 400 does not need to set the information stored in each wireless tag 600 that is the determination target, which is included in the second range, as a processing target.

The number of pieces of data of the plurality of pieces of determinative tag data of each wireless tag 600 that is the determination target, which is measured in the single measurement process, will be described. Here, the description will be given using a case where the measurement aspect is the movement speed of the antenna 300 as an example.

Figure 8:
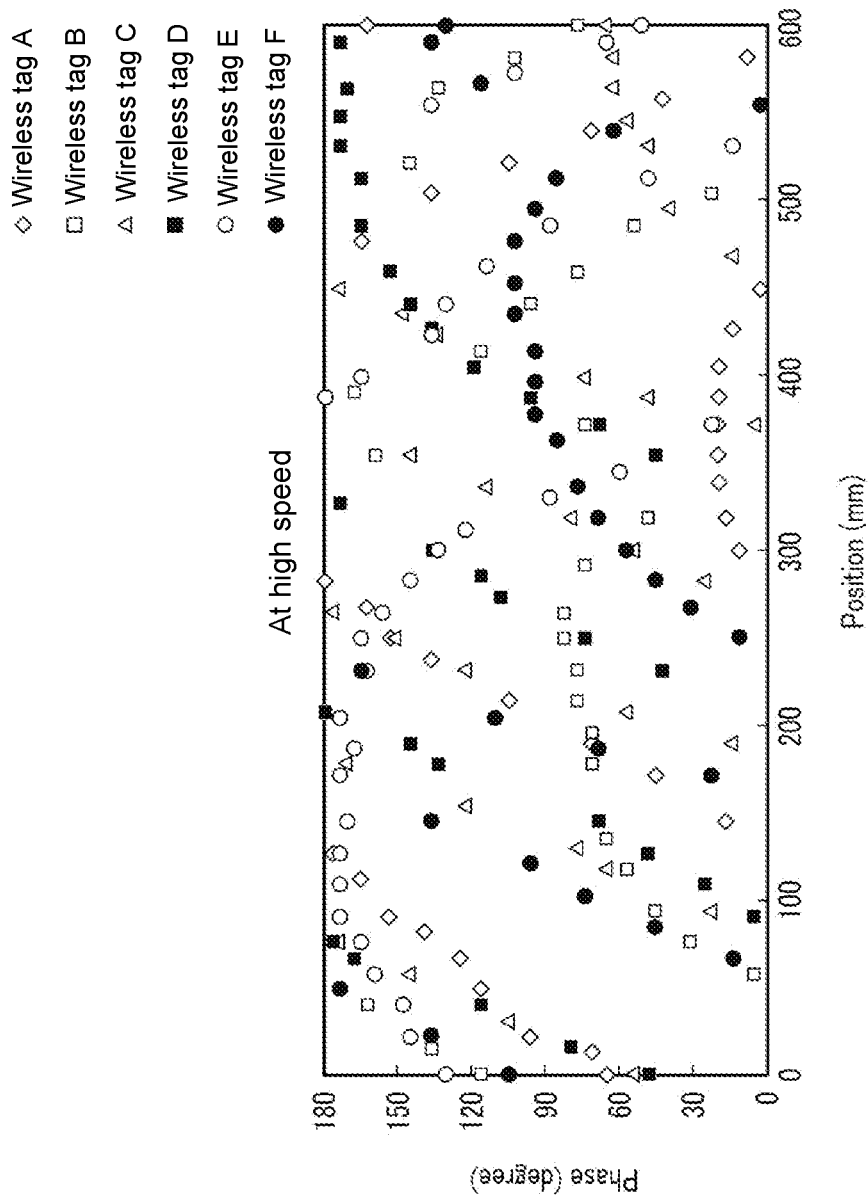
FIG. 8 is a graph showing an example of determinative tag data measured with a high-speed movement of an antenna according to the embodiment.

FIG. 8 is a graph showing an example of determinative tag data measured with a high-speed movement of the antenna 300. The horizontal axis denotes the position of the antenna 300. It is assumed that the position L is 600 mm. The vertical axis denotes the phase. The graph shows a plurality of determinative tag data sets with respect to each of wireless tags A to F. The wireless tags A to F are the wireless tags 600 that are the determination targets.

Figure 9:
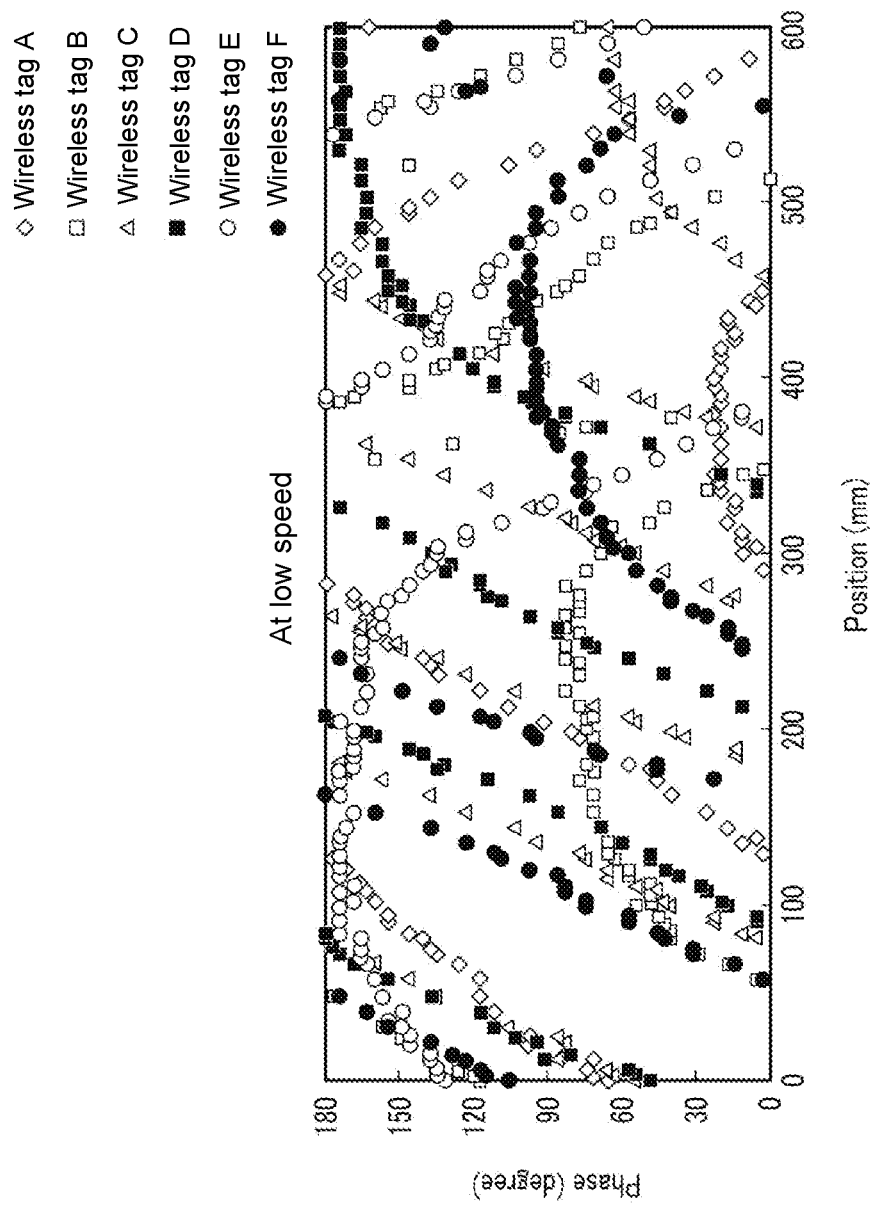
FIG. 9 is a graph showing an example of determinative tag data measured with a low-speed movement of the antenna according to the embodiment.

FIG. 9 is a graph showing an example of determinative tag data measured with a low-speed movement of the antenna 300. The horizontal axis denotes the position of the antenna 300. It is assumed that the position L is 600 mm. The vertical axis denotes the t phase. The graph shows a plurality of determinative tag data sets with respect to each of the wireless tags A to F. The speed of the antenna 300 in the measurement process for the plurality of determinative tag data sets illustrated in FIG. 9 is lower than the measurement process for the plurality of determinative tag data sets illustrated in FIG. 8.

As it can be seen by comparing FIG. 8 with FIG. 9, the number of pieces of data of the plurality of pieces of determinative tag data included in each determinative tag data set increases as the movement speed of the antenna 300 lowers. FIGS. 8 and 9 show the graphs regarding the phase, and the same applies to the received signal strength indicator.

A measurement example for the learning tag data included in the learning data that is used for generating the learned model will be described.

Figure 10:
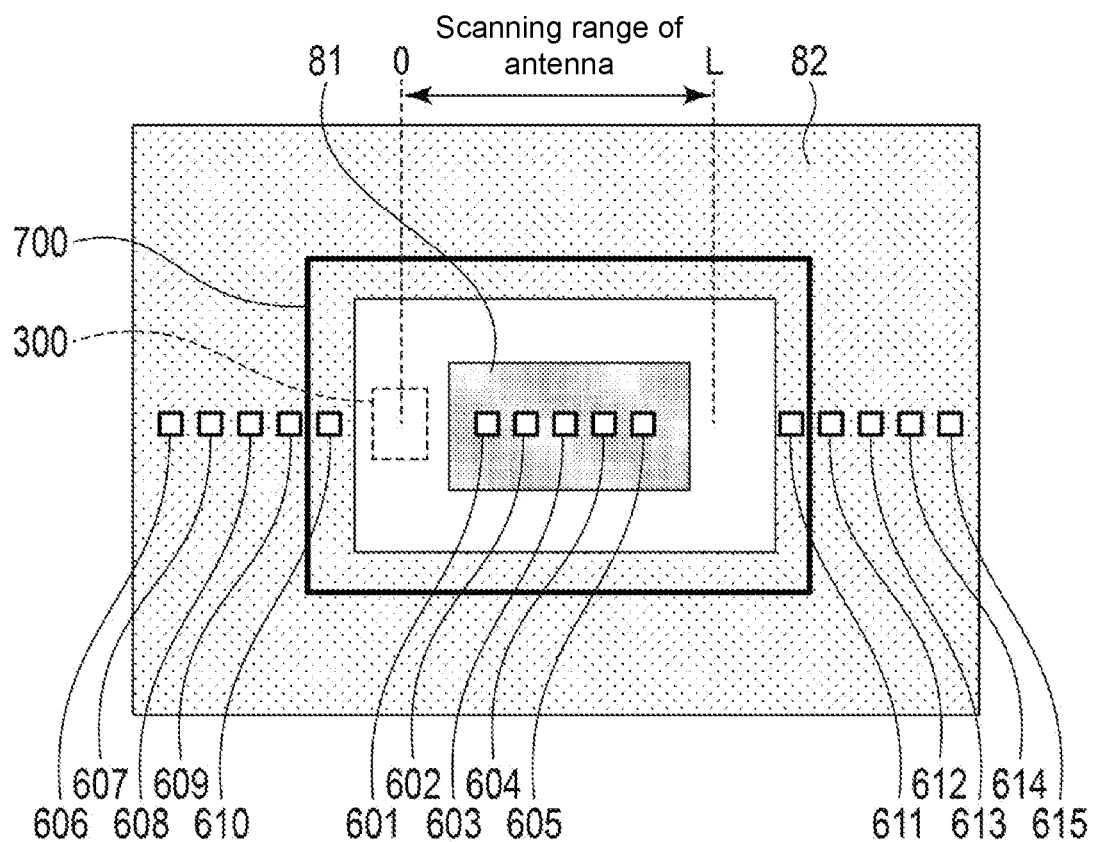
FIG. 10 is a diagram showing an arrangement example of wireless tags that are a plurality of learning targets according to the embodiment.

FIG. 10 is a diagram showing an arrangement example of wireless tags 601 to 615 that are a plurality of learning targets, and is a plan view as the counter table 700 is viewed from above. The wireless tags 601 to 615 that are the plurality of learning targets are examples of the wireless tag 600.

The wireless tags 601 to 615 are arranged on a virtual plane including the horizontal surface of the counter table 700 so as to be vertically parallel to one direction in which the antenna 300 moves. The wireless tags 601 to 605 are arranged at different positions so as to be included in the first range 81. The wireless tags 601 to 605 are arranged in the stated order so as to be further from the position 0. The antenna 300 passes through positions corresponding to the respective wireless tags in the order of the wireless tags 601 to 605 during movement from the position 0 to the position L.

The wireless tags 606 to 610 are arranged at different positions so as to be included in the second range 82. The wireless tags 606 to 610 are arranged in the stated order so as to be closer to the position 0. The antenna 300 moves away from the wireless tags 606 to 610 during movement from the position 0 to the position L.

The wireless tags 611 to 615 are arranged at different positions so as to be included in the second range 82. The wireless tags 611 to 615 are arranged in the stated order so as to be further from the position L. The antenna 300 moves closer to the wireless tags 611 to 615 during movement from the position 0 to the position L.

It should be noted that the number of wireless tags that are the plurality of learning targets and the arrangement example of the wireless tags are not limited to the example shown in FIG. 10. It is sufficient that some of the wireless tags that are the plurality of learning targets are arranged in the first range 81 and the rest of the wireless tags that are the plurality of learning targets is arranged in the second range 82.

The plurality of pieces of learning tag data of the wireless tags 601 to 615 in the plurality of positions of the antenna 300 will be described. Here, the description will be given using the phase data as an example of the learning tag data.

Figure 11:
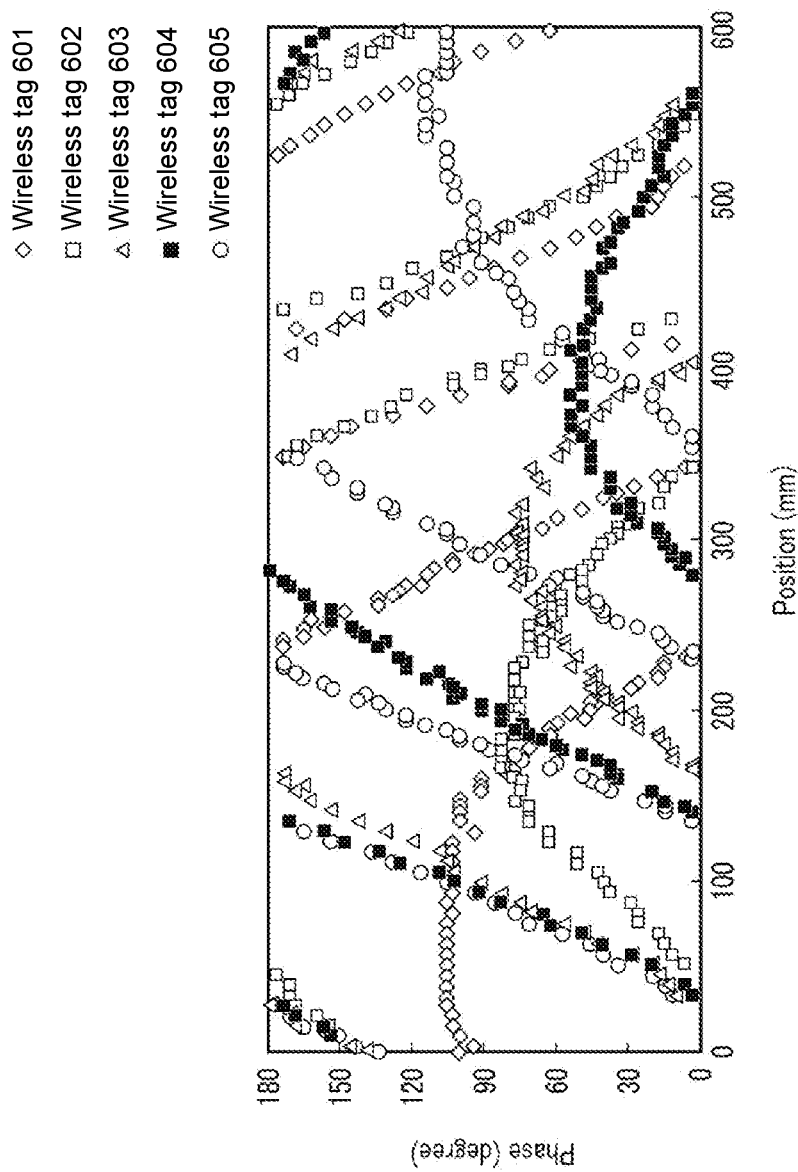
FIG. 11 is a graph showing an example of learning tag data according to the embodiment.

FIG. 11 is a graph showing an example of the plurality of pieces of learning tag data of the wireless tags 601 to 605 at the plurality of positions of the antenna 300. The horizontal axis denotes the position of the antenna 300. It is assumed that the position L is 600 mm. The vertical axis denotes the phase. The graph shows a phase at each of the positions in the constant intervals a between the position 0 to the position L with respect to each of the wireless tags 601 to 605.

The phase of each of the wireless tags 601 to 605 varies as the position of the antenna 300 changes. It is because the distance between the antenna 300 and each of the wireless tags 601 to 605 changes as the antenna 300 moves. Irrespective of where the antenna 300 is located, the phase of each of the wireless tags 601 to 605 is different. It is because the distance between the antenna 300 and each of the wireless tags 601 to 605 is different.

Figure 12:
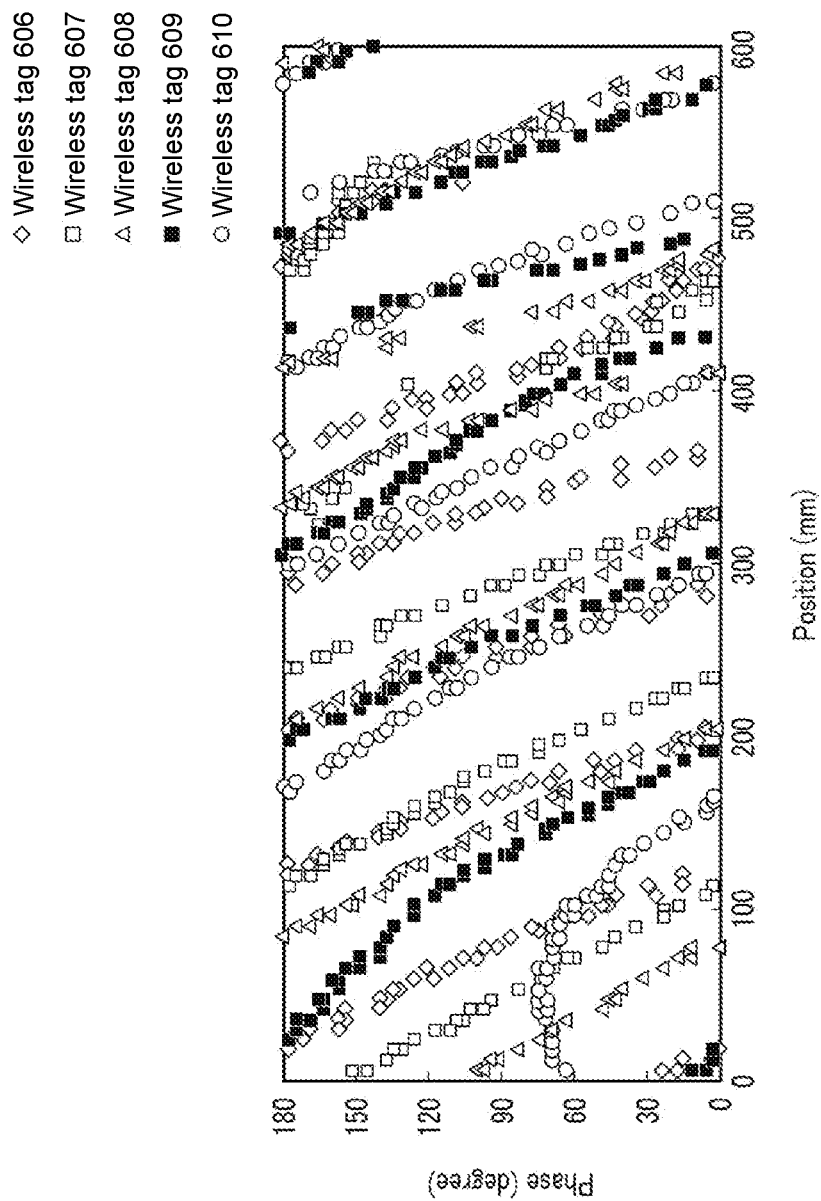
FIG. 12 is a graph showing another example of the learning tag data according to the embodiment.

FIG. 12 is a graph showing an example of the plurality of pieces of learning tag data of the wireless tags 606 to 610 at the plurality of positions of the antenna 300. The horizontal axis denotes the position of the antenna 300. It is assumed that the position L is 600 mm. The vertical axis denotes the phase. The graph shows a phase at each of the positions in the constant intervals a between the position 0 to the position L with respect to each of the wireless tags 606 to 610.

The phase of each of the wireless tags 606 to 610 varies as the position of the antenna 300 changes. Irrespective of where the antenna 300 is located, the phase of each of the wireless tags 606 to 610 is different.

Figure 13:
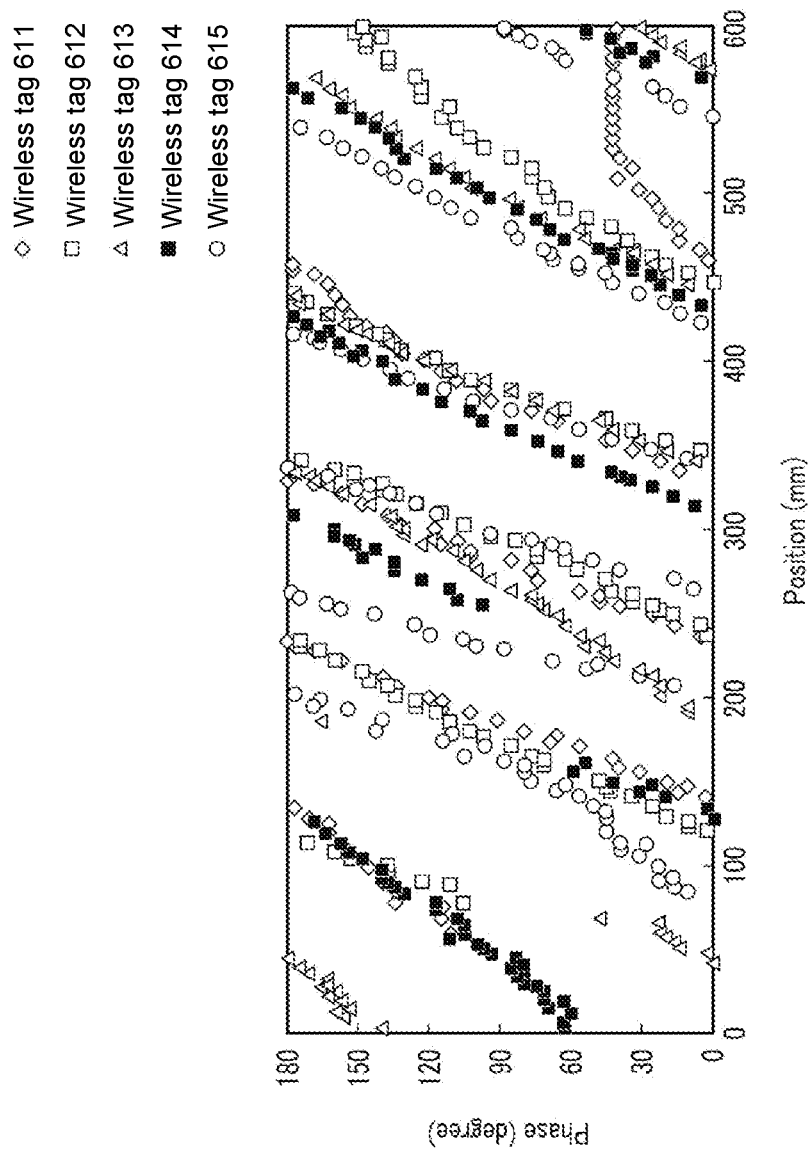
FIG. 13 is a graph showing still another example of the learning tag data according to the embodiment.

FIG. 13 is a graph showing an example of the plurality of pieces of learning tag data of the wireless tags 611 to 615 in the plurality of positions of the antenna 300. The horizontal axis denotes the position of the antenna 300. It is assumed that the position L is 600 mm. The vertical axis denotes the phase. The graph shows a phase at each of the positions in the constant intervals a between the position 0 to the position L with respect to each of the wireless tags 611 to 615.

The phase of each of the wireless tags 611 to 615 varies as the position of the antenna 300 changes. Irrespective of where the antenna 300 is located, the phase of each of the wireless tags 611 to 615 is different.

Although the characteristics of the phase data have been described, the same applies to characteristics of the received signal strength indicator data. The received signal strength indicator of each of the wireless tags 601 to 615 varies as the position of the antenna 300 changes. It is because the distance between the antenna 300 and each of the wireless tags 601 to 615 changes as the antenna 300 moves. Irrespective of where the antenna 300 is located, the received signal strength indicator of each of the wireless tags 601 to 615 is different. It is because the distance between the antenna 300 and each of the wireless tags 601 to 615 is different.

As described above, the processor 101 of the reading apparatus 100 acquires the plurality of pieces of learning tag data of the wireless tags 600 that are the plurality of learning targets at the plurality of positions of the antenna 300. Accordingly, the processor 101 of the reading apparatus 100 acquires a plurality of data sets with respect to the wireless tags 600 that are the plurality of learning targets. For example, the plurality of positions of the antenna 300 includes, as described above, the positions in the constant intervals a between the position 0 to the position L. The plurality of positions of the antenna 300 may include one or more positions different from the positions in the constant intervals a between the position 0 to the position L. The processor 101 stores the acquired learning tag data in the learning data storage area 1112.

Figure 14:
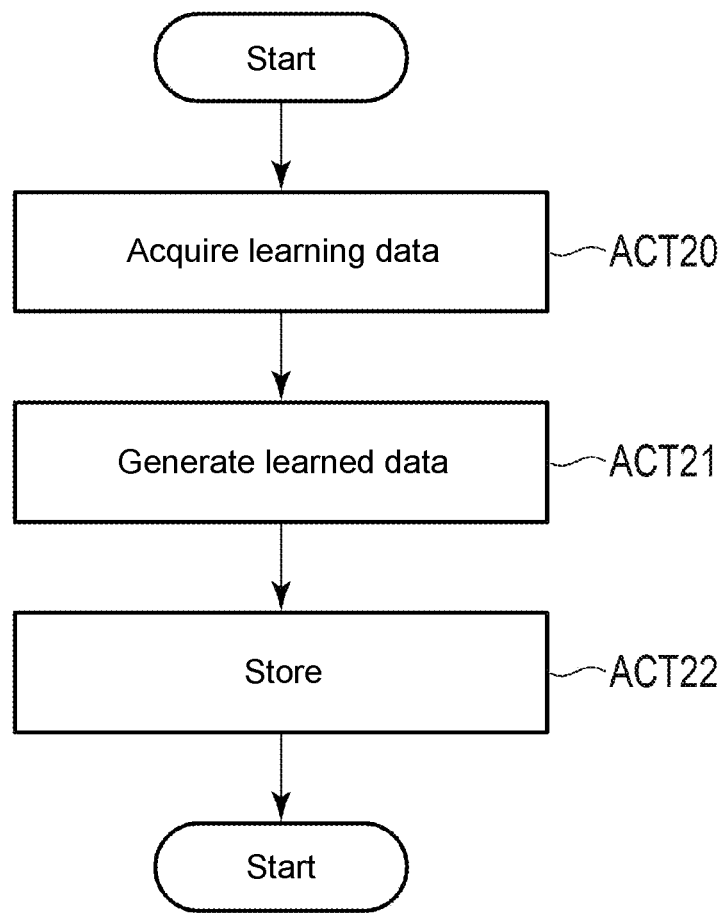
FIG. 14 is a flowchart showing an example of a generation process for a learned model by the processor of the reading apparatus according to the embodiment.

FIG. 14 is a flowchart showing an example of a generation process for the learned model by the processor 101 of the reading apparatus 100. It should be noted that a procedure of processes to be described below is merely an example, and each process may be changed as long as it is possible. Further, as to the procedure of processes to be described below, steps can be omitted, substituted, or added as appropriate in accordance with the embodiment.

The model processing unit 1017 may start the generation process for the learned model at an arbitrary timing and newly create a learned model. The model processing unit 1017 may start the generation process for the learned model at an arbitrary timing and update the learned model.

In ACT20 of FIG. 14, the model processing unit 1017 of the processor 101 acquires learning data. For example, the model processing unit 1017 acquires learning data from the learning data storage area 1112.

In ACT21, the model processing unit 1017 of the processor 101 generates learned model by machine learning based on the learning data. For example, the model processing unit 1017 learns the learning data by machine learning. The model processing unit 1017 estimates a relationship between the plurality of data sets regarding the wireless tags 600 that are the plurality of learning targets and correct data indicating the range in which each of the wireless tags 600 that are the plurality of learning targets is present. The model processing unit 1017 generates a learned model on the basis of the estimation. A neural network or the like is used for the machine learning, though not limited thereto.

The learning tag data of the wireless tags 600 that are the learning targets varies depending on the distance between the antenna 300 and each of the wireless tags 600 that are the learning targets irrespective of whether the tag data is phase data or received signal strength indicator data. The pattern of the data set regarding the wireless tags 600 that are the learning targets is different for each of the positions of the wireless tags 600 that are the learning targets. The data set regarding the wireless tags 600 that are the learning targets and the positions of the wireless tags 600 can have a certain correlation. Therefore, the tag data set regarding the wireless tags 600 and the level regarding the range in which the wireless tags 600 are present can have a certain correlation.

In ACT 22, the model processing unit 1017 of the processor 101 stores the generated learned model in the learned model storage area 1113.

In accordance with this embodiment, the communication apparatus includes an antenna. The communication apparatus includes a drive unit that moves a position of the antenna. The communication apparatus includes a first acquisition unit that acquires tag data of each wireless tag at a plurality of positions of the antenna. The communication apparatus includes an input unit that inputs the tag data of each wireless tag acquired by the first acquisition unit into a learned model. The communication apparatus acquires, on the basis of the input of the tag data of each wireless tag into the learned model by the input unit, data indicating a level regarding a range in which each wireless tag is present from the learned model. In a case where the levels of the plurality of wireless tags acquired on the basis of the one or more measurement processes for the plurality of wireless tags do not satisfy the condition, the measurement control unit controls the measurement process involving a change of the measurement aspect with respect to the plurality of wireless tags. The learned model is a model generated by machine learning based on the learning data. The learning data includes the data indicating the tag data of the wireless tags that are the plurality of learning targets and the range in which each of the wireless tags that are the plurality of learning targets is present. The communication apparatus is capable of repeating the measurement process involving the change of the measurement aspect until the level of each of all the plurality of wireless tags satisfies the condition. Since the communication apparatus performs a measurement process of changing the measurement aspect, the communication apparatus is capable of acquiring the level of each of all the wireless tags that satisfy the condition. Therefore, the communication apparatus can provide a technology of improving the determination accuracy of the positions of the wireless tags.

The measurement aspect includes a movement speed of the antenna. The measurement process involving the change of the measurement aspect a includes measurement process involving lowering the movement speed of the antenna. Since the communication apparatus lowers the movement speed of the antenna and performs the measurement process, the communication apparatus can increase the number of pieces of data of the tag data of each wireless tag, which can be measured in the single measurement process. As the number of pieces of data of the tag data of the wireless tags increases, it is more likely that the level regarding the range in which the wireless tag is present satisfies the condition. Therefore, the communication apparatus is capable of acquiring the level of each of all the wireless tags that can satisfy the condition by lowering the movement speed of the antenna and performing the measurement process.

The measurement aspect includes masking the wireless tag. The measurement process involving the change of the measurement aspect includes a measurement process involving masking the one or more wireless tags that satisfy the condition. By masking the one or more wireless tags that satisfy the condition, the communication apparatus is capable of performing the measurement process, focusing on the wireless tags that do not satisfy the condition. The communication apparatus is capable of increasing the number of pieces of data of the tag data of each wireless tag, which can be measured in the single measurement process, by narrowing the wireless tags the tag data of which is to be measured. As the number of pieces of data of the tag data of the wireless tags increases, it is more likely that the level regarding the range in which the wireless tag is present satisfies the condition. Therefore, the communication apparatus is capable of acquiring the level of each of all the wireless tags that can satisfy the condition by masking the wireless tags that satisfy the condition and performing the measurement process.

The level includes the first level regarding that the wireless tag is included in the first range and the second level regarding that the wireless tag is included in the second range. The condition includes a condition that the first level is equal to or larger than the first threshold or the second level is equal to or larger than the second threshold. With respect to the plurality of wireless tags, the communication apparatus is capable of changing the measurement aspect and repeating the measurement process until the first level becomes equal to or larger than the first threshold or the second level becomes equal to or larger than the second threshold. Therefore, with respect to each of the plurality of wireless tags, the communication apparatus can provide a technology of improving the accuracy of determining whether the wireless tag is present in either the first range or the second range.

The tag data includes at least one of the phase data or the received signal strength indicator data. By using at least one of the phase data or the received signal strength indicator data, the communication apparatus can improve the accuracy of the level regarding the range in which each wireless tag is present.

A modified example of this embodiment will be described. The example in which the processor 101 of the reading apparatus 100 realizes the model processing unit 1017 that generates the learned model has been described, though not limited thereto. An apparatus other than the reading apparatus 100 may generate the learned model.

The example in which the storage device 111 of the reading apparatus 100 stores the learning data and the learned model has been described, though not limited thereto. The learning data and the learned model may be stored in one or more apparatuses different from the reading apparatus 100.

The example in which the processor 101 of the reading apparatus 100 acquires the determinative output data by processing of the software has been described, though not limited thereto. The communication apparatus 10 may include a reasoner using the learned model. In this example, the input unit 1014 of the processor 101 inputs the determinative input data into the reasoner. Inputting the determinative input data into the learned model by the reading apparatus 100 includes sending the determinative input data to the reasoner from the reading apparatus 100. The second acquisition unit 1015 of the processor 101 acquires the determinative output data from the learned model on the basis of the input of the determinative input data into the learned model. Acquiring the determinative output data from the learned model by the reading apparatus 100 includes receiving the determinative output data from the reasoner by the reading apparatus 100.

The communication apparatus may be realized by the plurality of apparatuses as described above in the example or may be realized by a single apparatus integrating the functions of the plurality of apparatuses. The reading apparatus, the driving apparatus, and the antenna may be realized by the single apparatus integrating the functions. The reading apparatus may be realized by the plurality of apparatuses in which the functions are distributed.

The programs may be transferred in a state stored in the apparatus according to the embodiment or may be transferred in a state not stored in the apparatus. In the latter case, the programs may be transferred over a network or may be transferred in a state recorded on a storage medium. The storage medium is a non-transitory physical medium. The storage medium is a computer-readable medium. The storage medium only needs to be a medium capable of storing programs of a CD-ROM, a memory card, and the like and capable of being read by the computer, and can be in any form.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus, comprising:
an antenna;
a motor configured to move the antenna in a first direction and a second direction opposite to the first direction within a predetermined range in a measurement region;
a storage device; and
a processor configured to
perform a measurement process in accordance with a measurement aspect, the measurement process comprising:
controlling the motor to start moving the antenna in the first direction,
acquiring tag data of each of a plurality of wireless tags in the measurement region at a plurality of positions of the antenna that is moving via the antenna and storing the acquired tag data in the storage device,
inputting the acquired tag data of each of the plurality of wireless tags that is stored in the storage device into a learned model upon the antenna reaching an end of the predetermined range in the first direction, the learned model being a model generated by machine learning based on learning data, the learning data including tag data of learning target wireless tags and data indicating a range in which each of the learning target wireless tags is present,
acquiring, on a basis of the input of the tag data of each of the plurality of wireless tags into the learned model, level data indicating a level regarding a probability that each of the plurality of wireless tags is present in a certain subregion in the measurement region from the learned model and storing the acquired level data in the storage device, and determining whether the acquired level data satisfies a predetermined condition, and repeat, upon determining that the acquired level data does not satisfy the predetermined condition, the measurement process by changing a moving direction of the antenna to the second direction and the measurement aspect.

2. The communication apparatus according to claim 1, wherein the measurement aspect includes a movement speed of the antenna.

3. The communication apparatus according to claim 2, wherein the change of the measurement aspect includes a decrease of the movement speed of the antenna.

4. The communication apparatus according to claim 1, wherein the measurement aspect includes masking one or more of the plurality of wireless tags.

5. The communication apparatus according to claim 4, wherein the change of the measurement aspect includes masking one or more of the plurality of wireless tags that reaches a predetermined level.

6. The communication apparatus according to claim 1, wherein the level includes a first level regarding a probability that a wireless tag is in a first subregion and a second level regarding a probability that the wireless tag is in a second subregion.

7. The communication apparatus according to claim 6, wherein the predetermined condition is satisfied when the first level of each of the plurality of wireless tags is equal to or larger than a first threshold or the second level of each of the plurality of wireless tags is equal to or larger than a second threshold.

8. The communication apparatus according to claim 1, wherein the tag data includes at least one of phase data or received signal strength indicator data.

* * * * *